Nov. 3, 1970     W. A. HEARN     3,537,184
DEVICES FOR GAUGING SCREW THREADS
Filed June 27, 1968
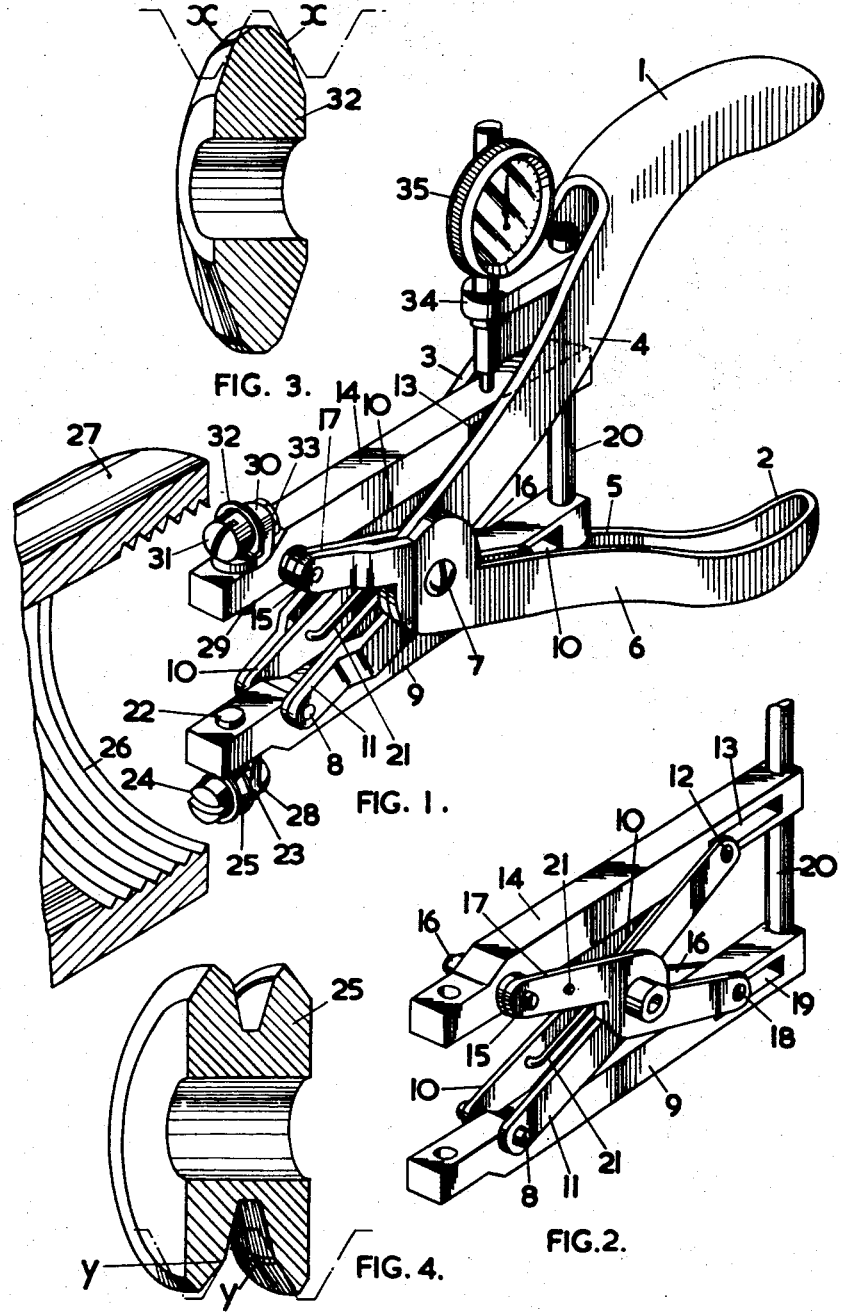

3,537,184
DEVICES FOR GAUGING SCREW THREADS
William Arthur Hearn, Bexley Heath, England, assignor to The Secretary of State for Defense in Her Britannic Majesty's Government of the United Kingdom of Great Britain and Northern Ireland, London, England
Filed June 27, 1968, Ser. No. 740,643
Claims priority, application Great Britain, June 27, 1967, 29,520/67
Int. Cl. G01b 3/14
U.S. Cl. 33—199     5 Claims

ABSTRACT OF THE DISCLOSURE

A device for gauging internal screwthreads consisting of a pair of tongs having parallel jaws, spring urged to open, which carry, on their outer faces, circular anvils for engaging the threads; one anvil being of male form to engage a trough and the other of female form to engage the crest of a thread. The dimensions of the edges of the anvils vary circumferentially thereof and the anvils are rotatable about their axis to set the device to test different screwthreads and are also rotatable about a perpendicular axis to accommodate to the helix angle of the thread.

---

The present invention relates to devices for gauging screwthreads and particularly for gauging internal screwthreads.

According to the invention, a device for the purpose just specified comprises a pair of tongs incorporating jaws which are spring urged toward their open position; two anvils mounted one on each jaw and having arcuate edge portions adapted to engage the screwthread at respective substantially diametrically opposite points thereof the said anvils being rotatable about the axes of their arcuate edge portions whose dimensions are varied circumferentially thereof, whereby the anvils may be set at selected angular positions for testing the conformity of the diameter and pitch of a screwthread to a selected standard and indicating means for indicating whether the thread does so conform. Provision is made whereby each anvil can be swung about an axis at right angles to and intersecting the axis of its arcuate edge portion, that is to say a transverse axis of a screw threaded bore or hole whose thread is being gauged, so as to accommodate to the helix angle of the thread. Preferably the device is provided with indexing means for ensuring the anvils shall be rotated to the correct settings for gauging a particular screwthread.

The anvil upon one of the jaw members may be of male form, that is to say capable of entering between opposing faces of adjacent thread convolutions, and the anvil upon the other jaw member may be of female form, in which case it will be capable of receiving the thread and contacting the flanks forming the opposite sides thereof. In one such arrangement the male element may be in the form of a disc which is both radially and circumferentially tapered, and the female anvil may be in the form of a disc which is provided within its peripheral edge with a groove which is of substantially V-shape and is of progressively varying width circumferentially of the disc. The radial taper of the male anvil may be composite so as to provide a narrow intermediate portion constituting a thread engaging surface extending around this anvil on each side face of its arcuate edge portion, and the radial taper of the groove in the female anvil may also be composite to provide a similar narrow intermediate portion on each side face of the groove, the arrangement being such for example that, in the case of the thread being correct, the distance between the said intermediate portions of the male anvil and the respective intermediate portions of the female anvil when engaging the screwthread would afford a measure of the effective diameter of the thread.

The device may be provided with means for giving an indicating of the accuracy of the thread or from which may be derived information as to the accuracy, or the device may be provided with means for operating a dial or other gauge.

Instead of the male anvil being tapered circumferentially its effective widtth may be varied in circumferential steps or divisions and the effective width of the groove in the female anvil may be correspondingly stepped.

Preferably the construction of the tongs is such that the jaws are maintained parallel to each other.

The invention will now be described, by way of example, with reference to the accompanying drawings, of which:

FIG. 1 is a perspective view of a screwthread gauging device according to the invention.

FIG. 2 is a perspective view showing more clearly certain details.

FIG. 3 is a perspective view showing an anvil of variable male form.

FIG. 4 is a similar view showing an anvil of variable female form.

In the construction shown in FIG. 1 of the drawings, the two main elements of the tongs comprise handles 1, 2, each formed integral with pairs of forwardly extending parallel arms 3, 4, and 5, 6, respectively, which pairs of arms are pivoted together with a pin 7, so that the pair of arms 3, 4, passes the arms 5, 6, and constitutes, with its handle 1, a lever, the arms 5, 6, and handle 2 constituting a second level.

The forward end of each of the arms 3, 4, is pivoted to the outer end portion of a pin 8 which passes through the forward portion of a bar 9, of rectangular crosssection. The pin 8 also passes through one end of two levers 10, 11, pivoted each at its mid-point upon the pin 7. The rear ends of the levers 10, 11, are connected together by a pin 12, as shown in FIG. 2, the middle portion of which passes through a slot 13, in a bar 14, similar to the bar 9.

The forward end of each of the arms 5, 6, is pivoted to the outer end of a pin 15 which passes through the forward part of the bar 14. The pin 15 also passes through one end of each of two levers 16, 17, pivoted each at its mid-point upon the pin 7, the rear ends of which levers 16, 17 are connected together by a pin 18, as shown in FIG. 2, the middle portion of which pin passes through a slot 19 in the bar 9. Fixed to the rear end portion of the bar 9 is one end of a rod 20 which rod passes through and forms a sliding fit in the rear end portion of the bar 14.

Coiled around the pin 7 is the central portion of a spring 21 the opposite ends of which spring are bent to permanently engage in perforations provided in the levers 10 and 17, the arrangement being such that the spring 21 normally maintains the tongs in the open position.

From the foregoing description it will be appreciated that the bars 9 and 14, which constitute the jaws of the tongs, are maintained parallel to each other.

Fixed to one end of a stub shaft 22 carried by and rotatable in the forward end portion of the bar 9 is a bracket 23 which is drilled and screwthreaded to receive a screw 24 on which is carried a circular anvil 25 which is capable of locating over the crest of a screw thread 26 in the interior of a sleeve 27, this anvil being the female anvil. A locknut 28 is provided upon the rear end of the screw 24. Provided at one end of a stub shaft 29 carried by and rotatable in the forward end of the bar 14 is a bracket 30 which is drilled and screwthreaded to receive a screw 31 on which is carried a circular anvil 32 which is capable of locating in the valley of the thread 26, this anvil being the male anvil. A locknut 33 is provided upon the rear end of the screw 31. The brackets 23 and 30, fixed to the respective rotatably carried stud shafts, 22, 29, permit the anvils 25 and 32 to accommodate themselves to the helix angle of the thread.

Upon reference to FIG. 3, it will be seen that, in addition to being radially tapered, the male anvil 32 is tapered circumferentially, the radially tapered groove in the female anvil 25 (FIG. 4) also being tapered circumferentially. After slackening the lock unts 28 and 33 and the screws 24 and 31, the anvils may be rotated to bring the appropriate width of the male anvil and of the groove of the female anvil into position for gauging any particular screwthread within the range of diameters and threads per inch within the scope of the device. The parts $x$ of the male anvil 32 contact the opposing flanks of adjacent thread convolutions and the parts $y$ of the female anvil 25 contact the opposite flanks of the thread so that in the case of a perfect thread the diametral distance between the middle of a part $x$ and the middle of the corresponding part $y$ would be equal to the effective diameter of the thread.

Carried at the end of the rod 20 remote from the bar 9 is a bracket 34 which carries a dial gauge 35 arranged to cooperate with the bar 14 to give the readings from which the accuracy of the thread can be ascertained.

Preferably the device is provided with indexing means (not shown), for example in the form of markings upon the anvils which markings may be set against a mark upon each respective bracket 30 and 23, for correctly setting the anvils.

Instead of the effective parts of the anvils being circumferentially tapered as hereinbefore described, they may be graded to form circumferential steps.

I claim:
1. A device for gauging internal screwthreads comprising a pair of parallel bars constituting a pair of jaws a parallel motion linkage connecting the bars for maintaining them parallel during use; spring means urging said jaws to their open position; a pair of tong handles pivoted to one another and one to each of the bars for moving said bars to close the jaws against the action of the spring means; two brackets mounted one on the outer face of each bar near one end thereof, which brackets are pivoted about a common axis perpendicular to each bar; two anvils mounted one on each bracket, rotation of the brackets serving to adjust the anvils to the helix angle of an internal screwthread under test, said anvils being of generally disc-like form and each incorporating a rim constituting an arcuate edge portion for engaging the screwthread at respective substantially diametrically opposite points thereof, and being rotatable about the axis of their arcuate edge portions, which axis is perpendicular to the rotary axis of the brackets, the dimensions of said arcuate edge portions being varied circumferentially whereby the anvils may be set at selected angular positions for testing the conformity of the diameter of the screwthread to a selected standard; and indicating means for indicating whether the screwthread does so conform.

2. A device as claimed in claim 1 wherein the arcuate edge portion of one anvil is of male form for engaging between opposed faces of adjacent convolutions of the screwthread and the arcuate edge portion of the other anvil is of female form, incorporating a peripheral groove for engaging the faces on each side of a single convolution of the screwthread.

3. A device as claimed in claim 2 wherein the arcuate edge portion of the anvil of male form and the peripheral groove of the anvil of female form are each of composite contour each having a narrow thread engaging surface extending circumferentially on each side face thereof.

4. A device as claimed in claim 1 wherein the indicating means comprises a dial gauge fixedly mounted on one bar and having a stem engaging the other bar for measuring the separation of the bars to indicate the accuracy of the screwthread under test.

5. A device as claimed in claim 1 wherein the parallel motion linkage comprises two pairs of crossed levers pivoted to one another at their centres the opposite ends of each lever being pivoted to the respective parallel bars the pivots at one pair of adjacent ends of the parallel bars being fixedly located relative to the bars and the pivots at the other pair of adjacent ends being slidable longitudinally relative to said bars.

References Cited

UNITED STATES PATENTS

| | | |
|---|---|---|
| 1,384,710 | 7/1921 | Morell. |
| 2,556,580 | 6/1951 | Fox et al. |
| 3,222,793 | 12/1965 | Johnson. |

FOREIGN PATENTS

| | | |
|---|---|---|
| 11,648 | 1915 | Great Britain. |
| 583,922 | 1/1947 | Great Britain. |
| 596,970 | 1/1948 | Great Britain. |

WILLIAM D. MARTIN, JR., Primary Examiner

U.S. Cl. X.R

33—147